United States Patent
Calleija et al.

(10) Patent No.: US 10,300,783 B2
(45) Date of Patent: May 28, 2019

(54) STATICALLY STABLE ROBOT USING WHEEL WITH INNER SYSTEM

(71) Applicant: THE UNIVERSITY OF SYDNEY, New South Wales (AU)

(72) Inventors: Mark Calleija, Rydalmere (AU); Salah Sukkarieh, Kogarah (AU)

(73) Assignee: THE UNIVERSITY OF SYDNEY, New South Wales (AU)

( * ) Notice: Subject to any disclaimer, the term of this patent is extended or adjusted under 35 U.S.C. 154(b) by 0 days.

(21) Appl. No.: 15/547,378

(22) PCT Filed: Jan. 29, 2016

(86) PCT No.: PCT/AU2016/050051
§ 371 (c)(1),
(2) Date: Jul. 28, 2017

(87) PCT Pub. No.: WO2016/119022
PCT Pub. Date: Aug. 4, 2016

(65) Prior Publication Data
US 2018/0022208 A1   Jan. 25, 2018

(30) Foreign Application Priority Data
Jan. 30, 2015  (AU) ................. 2015900285

(51) Int. Cl.
 *B60K 7/00*  (2006.01)
 *B60K 1/04*  (2019.01)
 (Continued)

(52) U.S. Cl.
 CPC ........... *B60K 7/0007* (2013.01); *B60K 1/04* (2013.01); *B60K 7/0015* (2013.01);
 (Continued)

(58) Field of Classification Search
 CPC ................. B60K 7/0007; B62K 11/007
 See application file for complete search history.

(56) References Cited

U.S. PATENT DOCUMENTS 6,488,306 B1 * 12/2002 Shirey .............. B60D 1/00
  280/474
7,426,970 B2 * 9/2008 Olsen .............. A61G 5/046
  180/65.1
(Continued)

FOREIGN PATENT DOCUMENTS

EP  0 424 577  5/1991

OTHER PUBLICATIONS

International Search Report and Written Opinion dated Mar. 23, 2016 for International Application No. PCT/AU2016/050051.
(Continued)

*Primary Examiner* — Brian L Swenson
(74) *Attorney, Agent, or Firm* — Womble Bond Dickinson (US) LLP

(57) ABSTRACT

The invention relates to a vehicle including a chassis and a pair of wheels supported in spaced apart relationship by the chassis for rotation about a common axis. A pair of drive modules is associated with the respective wheels. The drive modules and the chassis are connected for rotation as a sub-assembly relative to the wheels about the common axis with the centre of mass of the sub-assembly below the common axis in a static equilibrium position. Each of the drive modules is housed substantially within the respective wheel.

18 Claims, 10 Drawing Sheets

(51) Int. Cl.
*B60K 17/04* (2006.01)
*B60L 8/00* (2006.01)
*B60L 11/18* (2006.01)

(52) U.S. Cl.
CPC .......... *B60K 7/0023* (2013.01); *B60K 17/043* (2013.01); *B60L 8/003* (2013.01); *B60K 2001/045* (2013.01); *B60K 2007/0038* (2013.01); *B60K 2007/0061* (2013.01); *B60L 11/1877* (2013.01); *B60L 11/1879* (2013.01); *B60L 2200/16* (2013.01)

(56) References Cited

U.S. PATENT DOCUMENTS

| | | | | |
|---|---|---|---|---|
| 8,159,357 | B1* | 4/2012 | Jarvinen | G01V 9/02 340/580 |
| 8,496,077 | B2 | 7/2013 | Nesnas et al. | |
| 8,562,387 | B1* | 10/2013 | Henthorne | A63H 29/22 180/167 |
| 9,020,639 | B2* | 4/2015 | Bewley | B25J 5/005 700/250 |
| 2001/0042645 | A1 | 11/2001 | Van Den Berg | |
| 2002/0011368 | A1 | 1/2002 | Berg | |
| 2004/0129464 | A1* | 7/2004 | Arling | B62D 51/008 180/7.1 |
| 2005/0023052 | A1* | 2/2005 | Beck | B60K 7/0007 180/24.07 |
| 2010/0193260 | A1 | 8/2010 | Freeman | |
| 2011/0191013 | A1* | 8/2011 | Leeser | B62D 11/04 701/124 |
| 2014/0131126 | A1 | 5/2014 | Martinelli et al. | |
| 2015/0175202 | A1* | 6/2015 | MacGregor | G05D 1/0011 701/2 |
| 2016/0157414 | A1* | 6/2016 | Ackerman | A01B 69/008 701/25 |
| 2017/0349039 | A1* | 12/2017 | Rayner | B60K 1/04 |
| 2018/0079294 | A1* | 3/2018 | Kanatani | F16H 1/20 |
| 2018/0105033 | A1* | 4/2018 | Schnapp | B60K 7/0007 |

OTHER PUBLICATIONS

Extended European Search Report dated Sep. 14, 2018 in corresponding European Application No. 16742589.1.

* cited by examiner

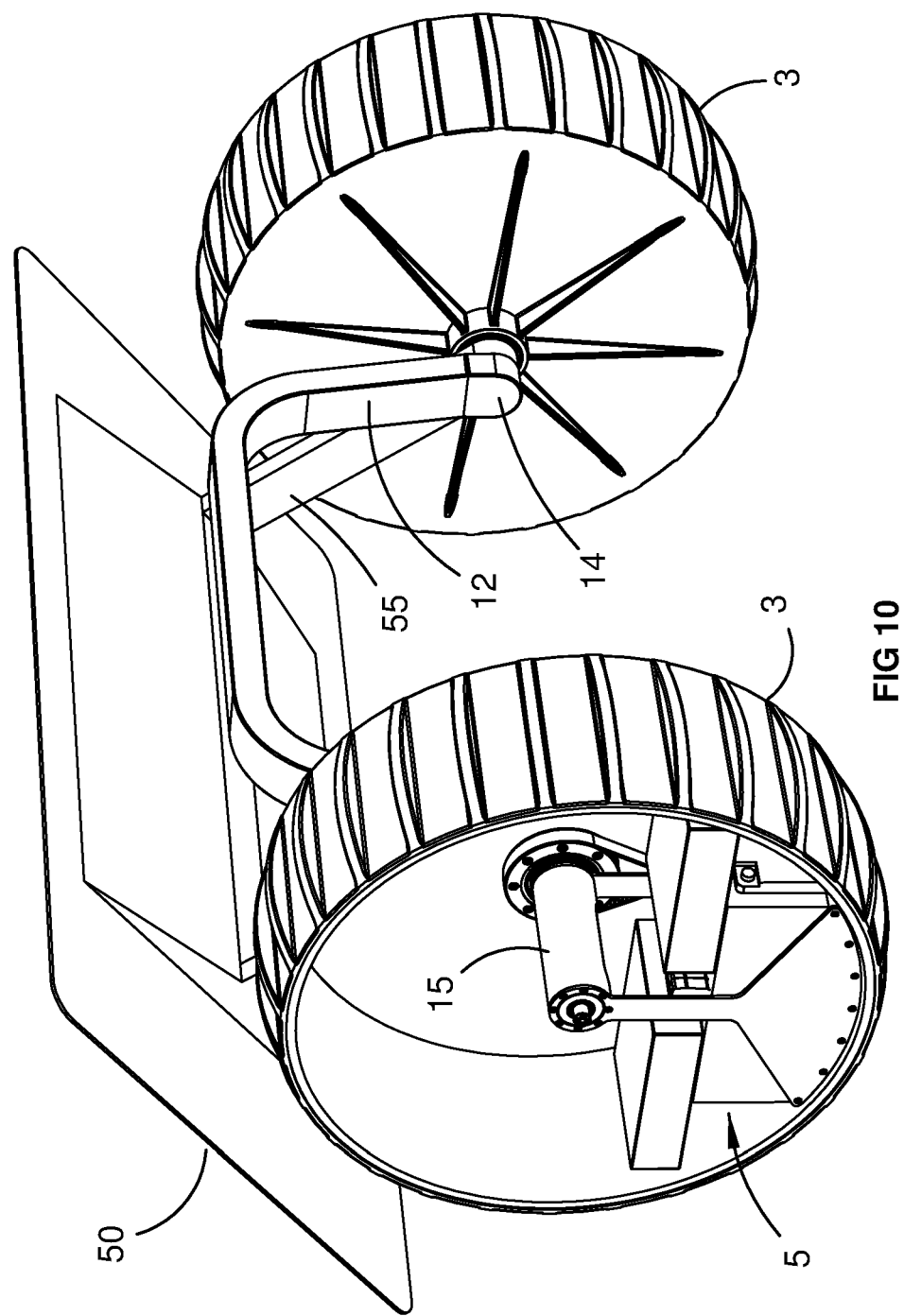

STATICALLY STABLE ROBOT USING WHEEL WITH INNER SYSTEM

CROSS-REFERENCE TO RELATED APPLICATIONS

This application is a national phase application filed under 35 U.S.C. § 371 of International Application No. PCT/AU2016/050051. filed Jan. 29. 2016, which claims priority from Patent Application No. AU 2015900285, filed Jan. 30. 2015.

FIELD OF THE INVENTION

The present invention relates generally to di-wheel vehicles. The Invention has been developed more particularly for use as a mobile platform in robotic applications such as in connection with agricultural, mining, defence, education, research, medical practice, space, logistics, urban and domestic robots and will be described predominately in this context. It should be appreciated, however, that the invention is not limited to this field of use, being potentially applicable in a wide variety of applications where a highly manoeuvrable vehicle or mobile platform is advantageous, including in the field of personal transportation.

BACKGROUND OF THE INVENTION

The following discussion of the prior art is intended to place the invention in an appropriate technical context and enable its advantages to be more fully appreciated. However, any references to prior art throughout this specification should not be construed as an express or implied admission that such art is widely known or is common general knowledge in the relevant field.

Various di-wheel vehicles, cycles and mobile platforms are known, with one of the better known implementations being the "Segway"™ personal transporter. Such vehicles or platforms typically incorporate a pair of wheels disposed in spaced apart relationship for co-axial rotation. An inner body, chassis or frame extends transversely between the wheels and is supported for rotation relative to the wheels about the same axis.

Key advantages of vehicles and platforms of this type include relative simplicity due to the absence of an independent steering mechanism, the compact nature of the design and the high degree of manoeuvrability. However, due to the absence of a third wheel, stability is an inherent challenge both statically and dynamically.

For many applications it is preferable for such vehicles to be statically stable. In order to ensure static stability, the centre of gravity of the body, chassis or frame, complete with payload, must be lower than the rotational axis of the wheels. This is usually achieved by mounting the chassis as low as possible relative to the rotational axis, and mounting the drive motors, batteries, structural members, other system components and if necessary additional counterweights as low as possible on, within or beneath the chassis. However, this inherently obstructs the space between the wheels and compromises ground clearance, thus rendering known vehicles of this type unsuitable in applications requiring relatively high levels of ground clearance. Moreover, the heavier the payload needed to be carried, and the higher centre of gravity of the payload, the lower the centre of gravity of the chassis structure must be, and hence the more the ground clearance must be reduced.

Ground clearance may be increased to some extent by increasing the outer diameter of the wheels. However, this inevitably gives rise to other design compromises in terms of overall vehicle size, weight, manoeuvrability and/or cost of manufacture.

It is an object of the present invention to overcome or ameliorate one or more disadvantages of the prior art, or at least to provide a useful alternative.

SUMMARY OF THE INVENTION

Accordingly, in a first aspect, the invention provides a vehicle including a chassis, a pair of wheels supported in spaced apart relationship by the chassis for rotation about a common axis, and a pair of drive modules associated with the respective wheels, wherein the drive modules and the chassis are connected for rotation as a sub-assembly relative to the wheels about the common axis with the centre of mass of the sub-assembly below the common axis in a static equilibrium position, and wherein each of the drive modules is housed substantially within the respective wheel.

Advantageously, this arrangement allows the connecting chassis and preferably any associated payload and additional system components to be positioned predominately above the wheel axis, with the combined mass effectively counterbalanced by the wheel-mounted drive modules, thereby allowing significantly greater ground clearance than would be possible with previously known configurations of di-wheel vehicles.

In preferred embodiments, the centres of mass of the drive modules in the static equilibrium position are disposed substantially below the common axis, to counterbalance the chassis and thereby allow the centre of mass of the chassis and any associated payload to be stably positioned substantially above the common axis.

Preferably, the drive modules are substantially frontally occluded by the respective wheels. In some embodiments, the wheels include tyres, in which case preferably, the drive modules are substantially frontally occluded by the respective tyres. Each wheel preferably defines a generally cylindrical cavity adapted to substantially accommodate the respective drive module. In some embodiments, the wheel cavities are substantially open. In other embodiments, the wheel cavities are substantially closed to protect the drive modules and associated componentry from mechanical damage, as well as ingress of dust or debris. In certain embodiments, a cover may be releasably mounted over each wheel cover, thereby to protect the drive modules and associated componentry. The tyres may be either solid or pneumatic and usable in a conventional rim-based implementation or alternatively formed with an internal skeleton structure supporting the internal walls of the tyre. In some embodiments, the solid tyres are formed of a relatively hard material, or are pneumatic tyres inflated to a relatively high pressure, thereby to minimise rolling and steering losses, and related power requirements of the drive modules/motors. In other embodiments, the solid tyres are formed of a relatively soft material, or are pneumatic tyres inflated to a relatively low pressure to maximise traction, improve roll axis stability, decrease ground contact pressure, improve passive roll axis stabilisation damping or improve the shock absorption to reduce the effects from bumps and undulations.

Preferably, each of the drive modules includes at least a drive motor. In one embodiment, the drive motors are electric, and each drive module preferably includes at least an electric motor and a battery for the motor. It should be appreciated, however, that alternative sources of motive power may be used, including hydraulic or pneumatic motors, as well as petrol, diesel or LPG engines.

In some embodiments, the drive modules preferably also include computerised control modules, power regulators and/or associated electronic components. In some embodiments, the drive modules preferably also include additional counterweights, thereby to enable the chassis to support additional payload mass or payloads with relatively higher centres of mass. In some embodiments, the extent of additional counterweight may be selectively adjustable, for example by installing or removing discrete weights formed from a heavy material such as iron or lead, or by adding or removing a liquid such as water from ballast tanks incorporated into the drive modules.

In preferred embodiments, the chassis includes a primary support platform adapted to support a payload. In some embodiments, the counterbalancing is arranged, whether intrinsically or by means of supplementary counterweight mass, such that the primary platform is predominantly supported at a level above, near or otherwise adjacent the wheels of the vehicle. It will be appreciated that in some embodiments, particularly if the intended payload is relatively light, the support platform may be positioned at a height well above the wheels, thereby enabling the vehicle to straddle obstacles of substantial height, and potentially of a height greater than that of the wheels themselves.

In one embodiment, the chassis is adapted to support one or more solar panels, to provide primary or supplementary electric power for the drive motors and thereby extend vehicle runtime. In some embodiments, the payload includes apparatus and systems whereby the vehicle is adapted to function autonomously or substantially autonomously. In some embodiments, the support platform is adapted for use as a launch pad for one or more other supplementary or autonomous vehicles such as UAVs, UGVs, AUVs or other teleoperable devices.

In one such variation, the support platform is configured to include one or more docking stations (shown schematically as 60 in FIG. 4) enabling periodic battery charging for one or more supplementary vehicles such as UAVs. The docking station may also include fluid transfer facilities for example to refill fluid storage tanks in the supplementary vehicle(s), data transfer facilities, supplementary computer processing facilities, or the like.

In one preferred embodiment, the support platform incorporates a basket, bucket or similar storage receptacle adapted for use in connection with agricultural or horticultural harvesting, weeding, pruning or thinning operations. In some such agricultural or horticultural harvesting applications, the vehicle may be adapted to straddle plants of various heights, wherein the diameter of the wheels and chassis ground clearance are sized accordingly. For example, the vehicle may be configured for traversing apple trees, with relatively large wheels (e.g. approximately 2 m diameter) and a chassis with relatively high ground clearance (e.g. approximately 4 m high). In such embodiments where the wheels have a relatively large diameter, solar panels may be installed on or inside the wheels in such a way that they are either fixed relative to the tyres with a means for passing electricity between rotating parts, or fixed relative to the chassis where no means for passing electricity between rotating parts is required. In other embodiments, the wheels may be quite small for use in toys, robotic pets, surveillance platforms, and the like.

In some embodiments, the wheels are sufficiently sealed to prevent ingress of water, thereby to maintain buoyancy and protect the drive modules and associated componentry against water damage. Such wheels are preferably of sufficient volume to enable them to float in water, thereby allowing for the provision of an amphibious floating vehicle or dedicated marine only vehicle (e.g. boat). In such embodiments, the propulsion of the vehicle is provided by, for example, grousers of the tyres acting as paddles. It will be readily appreciated that the inherent anti-tip or self-righting characteristic of the vehicle, in various embodiments, makes it particularly advantageous for marine applications in which rough seas are likely to be encountered, and for land-based vehicles required to traverse rough or uneven terrain. In particular, the inherent anti-tip or self-righting characteristic of the vehicle, provided by locating the centre of mass of the sub-assembly below the common axis of the wheels, acts under the force of gravity to level the chassis/platform relative to the wheels.

In one preferred embodiment, the chassis is adjustable in length, thereby allowing the track between the wheels to be selectively adjusted. In one embodiment, the adjustment mechanism incorporates telescopically extensible support rails. In one embodiment, the chassis is adjustable on the fly, in response to control inputs from a control system, to assist the vehicle to navigate obstacles or varying terrain conditions. In some embodiments, the chassis and/or support platform may also be selectively adjustable in height and in one variation this adjustment may similarly be effected on the fly in response to control inputs, for obstacle avoidance and/or path optimisation. The chassis may also incorporate suspension elements to accommodate a degree of passive or active height adjustment as the vehicle traverses obstacles or rough terrain, as well as to reduce and isolate the unsprung mass of the vehicle.

In preferred embodiments, the vehicle includes a dynamic stability control system adapted to reduce tilting oscillations around the common axis and/or to optimise path following performance.

In some embodiments, the angular orientation of the chassis or support platform, relative to the drive modules in the static equilibrium position, is selectively adjustable about the common axis. This may be advantageous for a variety of purposes, for example to orientate a solar panel on the support platform optimally toward the sun, to orientate a sail or blade for wind-assisted propulsion, to level the platform when operating on inclined terrain, to level the platform in compensation for unbalanced payloads, or to counteract the effect of dynamic forces during acceleration or deceleration of the vehicle. For similar purposes, the support platform in some embodiments may also be adjustable about other transverse, inclined or vertical axes.

In some preferred embodiments, the chassis includes a stabilising device having one or more fins or blades which act against the air to provide a reactive torque to the chassis for stabilising the chassis of the vehicle when the vehicle is in motion. In some embodiments, the fins or blades of the stabilising device may take the form of solar panels. In certain embodiments, the stabilising device can also be used to increase the effective torque that the wheels can apply relative to the chassis.

In some embodiments, the wheels may be cambered inwards in order to improve roll and/or pitch stability of the vehicle. In certain embodiments, a brake may be fitted within the wheels for slowing and stopping the vehicle.

In further embodiments, one or more additional wheels may be incorporated between, in front of or behind the primary drive wheels for stability, supplementary drive capacity, additional load bearing capacity, or other specific purposes. Any such additional wheels may be driven or free-wheeling, and may optionally incorporate steering mechanisms. In one particular variation, one or more additional wheels are supported for rotation on the common axis, either inboard or outboard of the primary wheels and associated drive modules. An example of such additional wheels takes the form of a trailer which is hitched to the vehicle such that the hitch is freely movable about respective roll and/or yaw axes. In such embodiments, the hitch is preferably not freely movable about the pitch axis, thereby to provide a degree of both stability and manoeuvrability for the vehicle-trailer system.

In some embodiments, two or more of the di-wheel vehicles may be integrated or coupled together, for example by means of an interconnecting chassis or bogie assembly, thereby effectively to create a composite vehicle with two, four, six or more wheels with similar attributes. In one such embodiment, two or more of the di-wheel vehicles may be adapted releasably to connect with one another for particular operational purposes, for example to transport loads beyond the capacity of a single vehicle, and subsequently to disconnect when required for independent operation. In some embodiments, two or more wheels on the same side of a composite vehicle of this type may be connected by tracks.

In some embodiments, the vehicle may be adapted to be releasably coupled to an operator or lead vehicle which is able to pull or push the vehicle along a desired path. The coupling between the operator and the vehicle may include a flexible or non-flexible member. For example, the coupling may be in the form of a tether, chain, rope, leash, ball and socket coupling, or other suitable coupling device. A control line may be associated with the coupling or otherwise extend between the operator and the vehicle such that the vehicle may be able to make use of one or more operating systems of the operator or lead vehicle including, for example, safety, ranging, localisation and imaging sensors and the like generally required for autonomous operation. In such embodiments, one or more sensors such as force, torque, or strain sensors or rotary encoders or the like may be used as input data by the lead vehicle for determining and controlling the direction and magnitude of motion of the vehicle coupled thereto.

Thus, the vehicle may be interoperable as a trailer, rather than a prime mover, whereby the prime mover (e.g. tractor, truck, etc.) can tow the vehicle without any requirement for the vehicle to localise and path plan its own position and course. In some embodiments, the may be adapted to generate electricity for its payload or to charge its batteries as it moves, whereby the operator does not need to connect electronic or other systems to power the vehicle when it is being used as a trailer. In such embodiments, the vehicle advantageously uses kinetic energy sourced from the leading vehicle through its wheels.

BRIEF DESCRIPTION OF THE DRAWINGS

Preferred embodiments of the invention will now be described, by way of example only, with reference to the accompanying drawings in which:

FIG. 10 is a perspective view showing another embodiment of the invention in which the angular orientation of the support platform is adjustable relative to the drive modules, independently of the chassis.

PREFERRED EMBODIMENTS OF THE INVENTION

Figure 1:
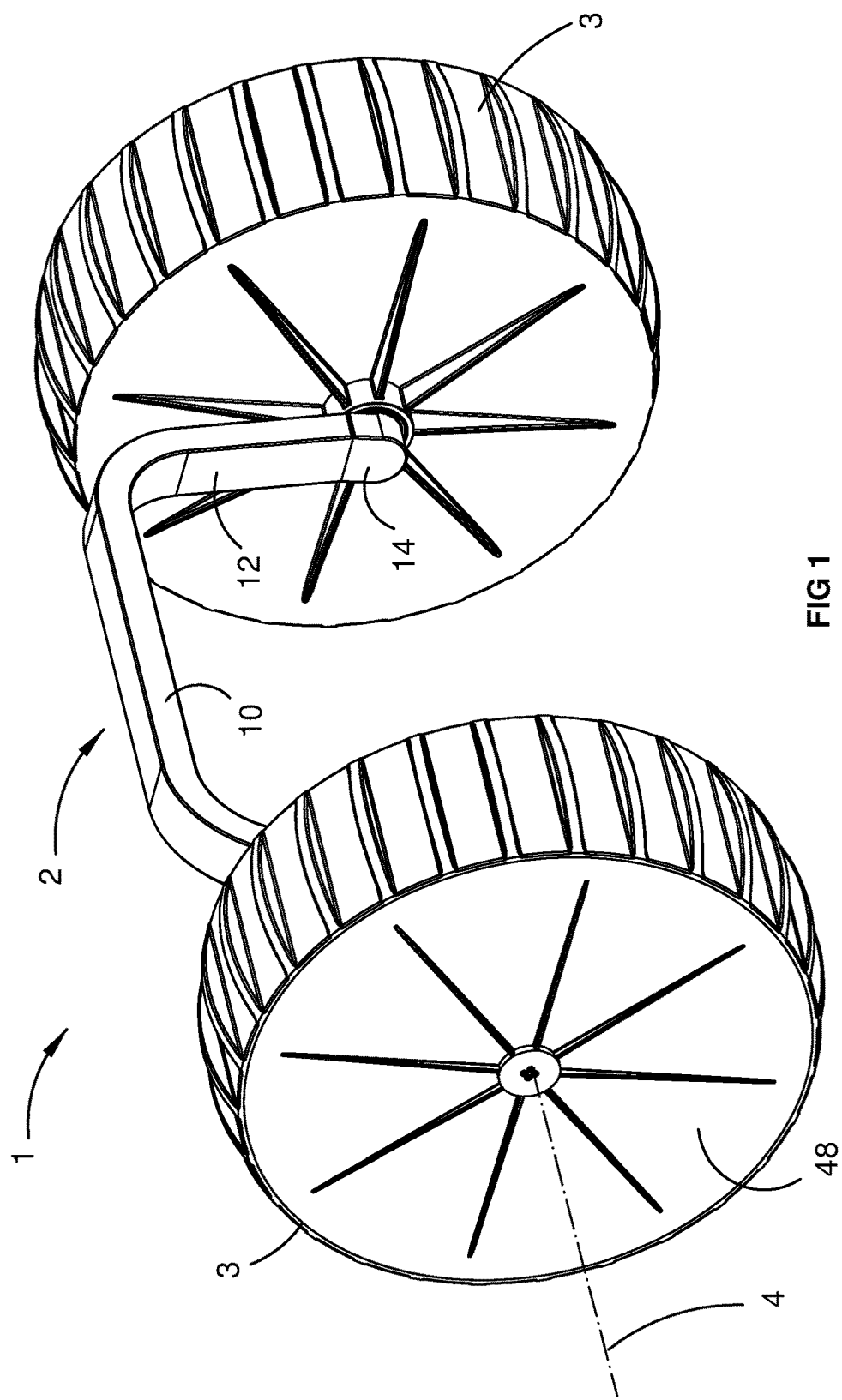
FIG. 1 is a perspective view showing a di-wheel vehicle according to a first embodiment of the invention.
Figure 2:
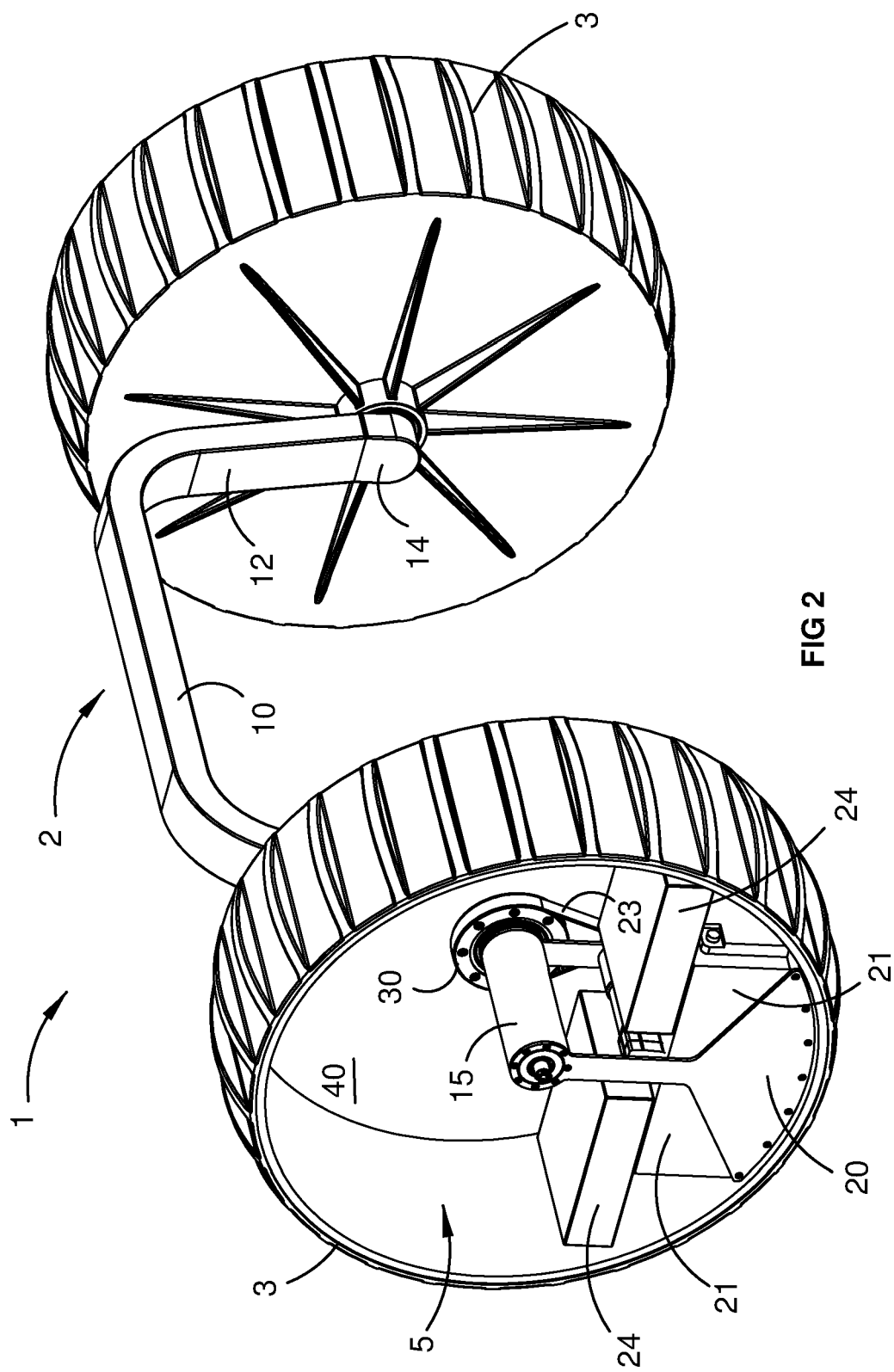
FIG. 2 is a perspective view of the vehicle of FIG. 1, with a wheel cover removed to reveal the respective internal drive module.
Figure 3:
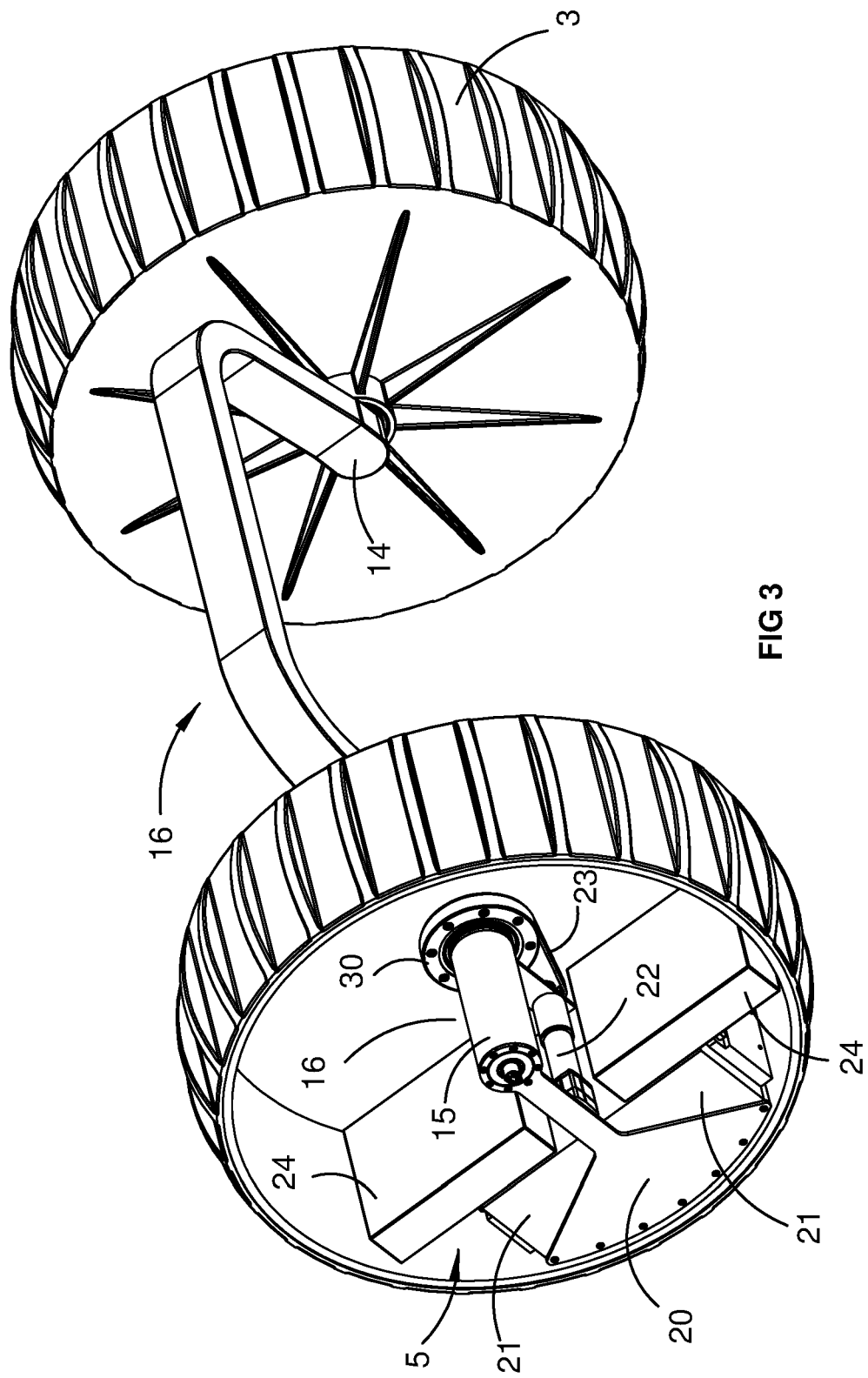
FIG. 3 is a perspective view of the vehicle of FIG. 2, in a forwardly inclined orientation, depicting rotation of the drive modules and chassis as a subassembly relative to the wheels.

Referring initially to FIGS. 1 to 3, the invention provides an omni-directional di-wheel vehicle 1 including a chassis 2, a pair of wheels 3 supported in spaced apart relationship by the chassis for rotation about a common axis 4, and a pair of drive modules 5 associated with the respective wheels. The wheels may incorporate integral treads or tyres as required for the intended application.

The chassis 2 includes a transverse bridge section 10, and a pair of legs 12 extending generally downwardly from opposite sides of the bridge section. The legs 12 are connected at their lower ends to the respective drive modules 5 by means of lugs 14 and tubular axle formations 15, which in turn support the respective wheels for independent rotation about the common axis, as described more fully below. The drive modules 5 and the chassis 2 are thereby interconnected via the tubular axle formations as a discrete subassembly 16 for rotation relative to the wheels about the common axis 4.

The combined centre of mass of the sub-assembly 16 is at a level substantially below the common axis in a static equilibrium position of the vehicle. This configuration allows the chassis and any associated payload or supplementary system components to be positioned well above the wheel axis, with the combined mass of the chassis and payload effectively counterbalanced by the substantial combined mass of the drive modules positioned below the wheel axis.

In this way, it will be appreciated that whenever the sub-assembly incorporating the chassis is rotated forwardly or rearwardly away from the generally upright equilibrium position, for example to the forward orientation as shown in FIG. 3, a gravitationally induced restoring force will tend to return the sub-assembly to the statically stable equilibrium position. Under static load conditions, this restoring force will progressively increase with the extent of angular deviation of the sub-assembly from the equilibrium position with a maximum force occurring at an angle of +/−90°.

Figure 5:
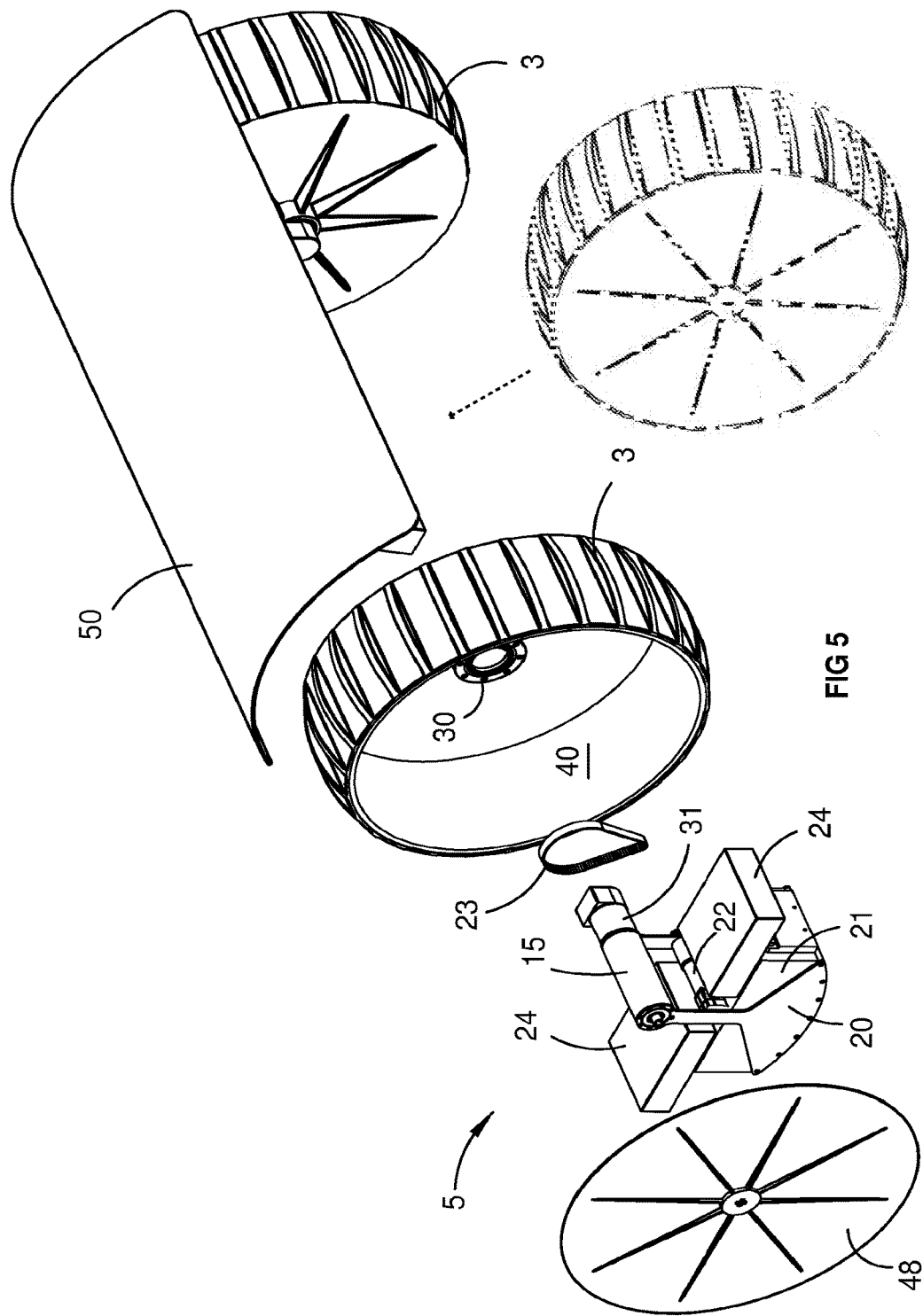
FIG. 5 is an exploded perspective view of the vehicle of FIG. 4, showing one of the drive modules in more detail.
Figure 6:
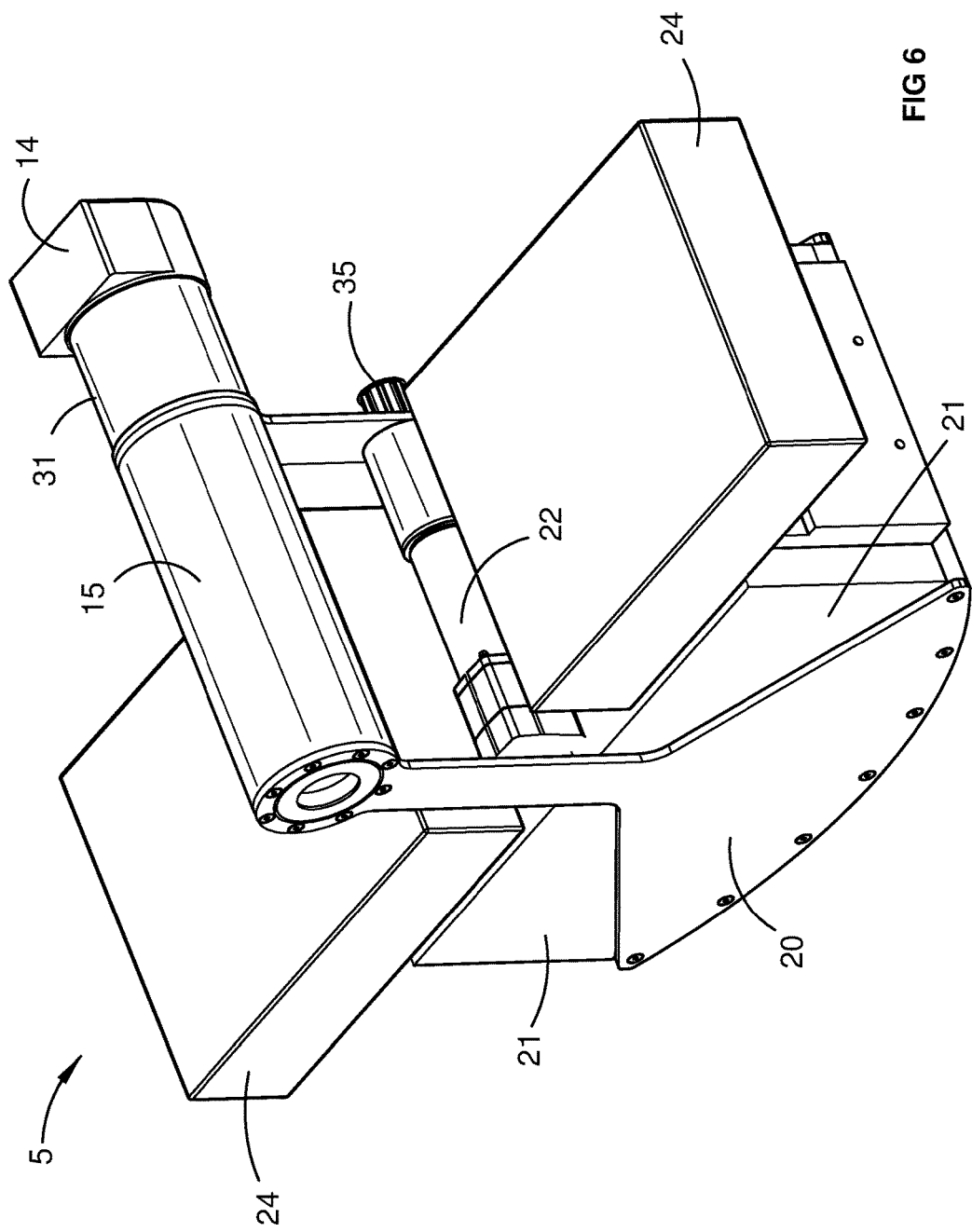
FIG. 6 is an enlarged perspective view of the drive module from FIG. 5.

As best seen in FIGS. 5 and 6, the primary components of each of the drive modules 5 include a counterweight 20, batteries 21, an electric motor 22, a toothed drive belt 23 for the motor, and electronics enclosures 24 containing computer modules, motor controllers, power regulators, sensors and the like.

Each wheel includes a drive hub assembly 30, fixedly connected to the respective wheel and adapted to be rotatably mounted by means of bearings to a reduced diameter section 31 of the respective axle 15. The outer circumferential periphery of the drive hub incorporates teeth for engagement with the complementary internal teeth on the drive belt. As best seen in FIG. 6, the drive belt also engages a toothed drive pinion 35 on an output drive spindle of the motor, thereby to transmit drive from the motor to the wheel via the belt and drive hub.

It will be appreciated that in further embodiments, other forms of drive motor such as hydraulic or pneumatic motors and other forms of transmission such as chains and sprockets, or gears trains or gearboxes, as well as direct drive mechanisms, may additionally or alternatively be used. In one such embodiment (not shown) an electric drive motor is integrated coaxially into the axle formation 15, with the tubular body of the axle formation integrated with a stator for the motor.

Figure 8:
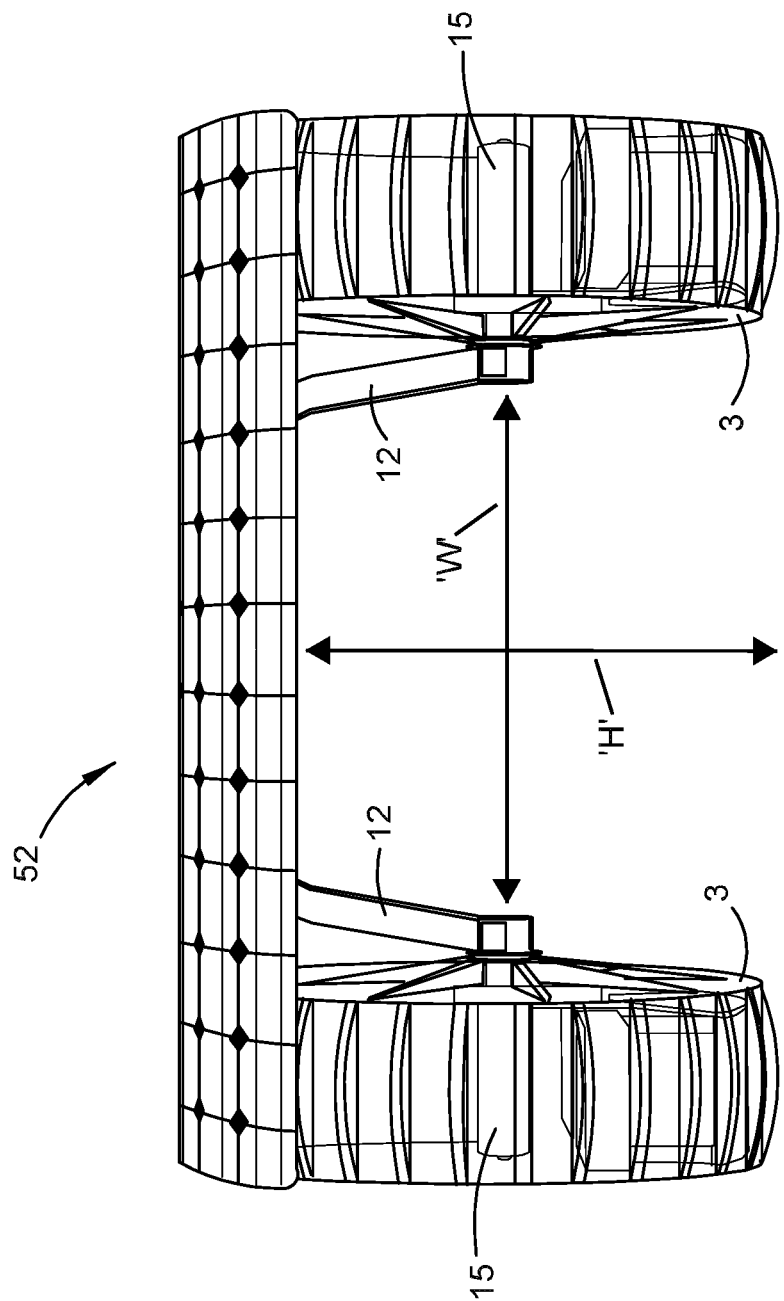
FIG. 8 is a front elevation view of the vehicle of FIG. 7, showing occlusion of the drive modules within the respective wheels, permitting the chassis to be predominantly supported at a height well above the rotational axis of the wheels in a statically stable equilibrium position.

As best seen in FIGS. 5 and 6, the various components of the drive modules, including the counterweights, are specifically sized, shaped and configured to be entirely or at least predominantly housed within complementary generally cylindrical cavities 40 formed within the respective wheels. In this way, the drive modules in use are wholly or at least substantially frontally occluded by the wheels, as best seen in FIG. 8.

In the embodiments shown, the wheel cavities are enclosed by removable outer covers 48 to protect the drive modules from mechanical damage and to minimise the ingress of dust or debris. In other embodiments, however, the wheel cavities may be partially or substantially open. Spoked, slotted or perforated wheels and/or wheel covers may also be used.

Figure 4:
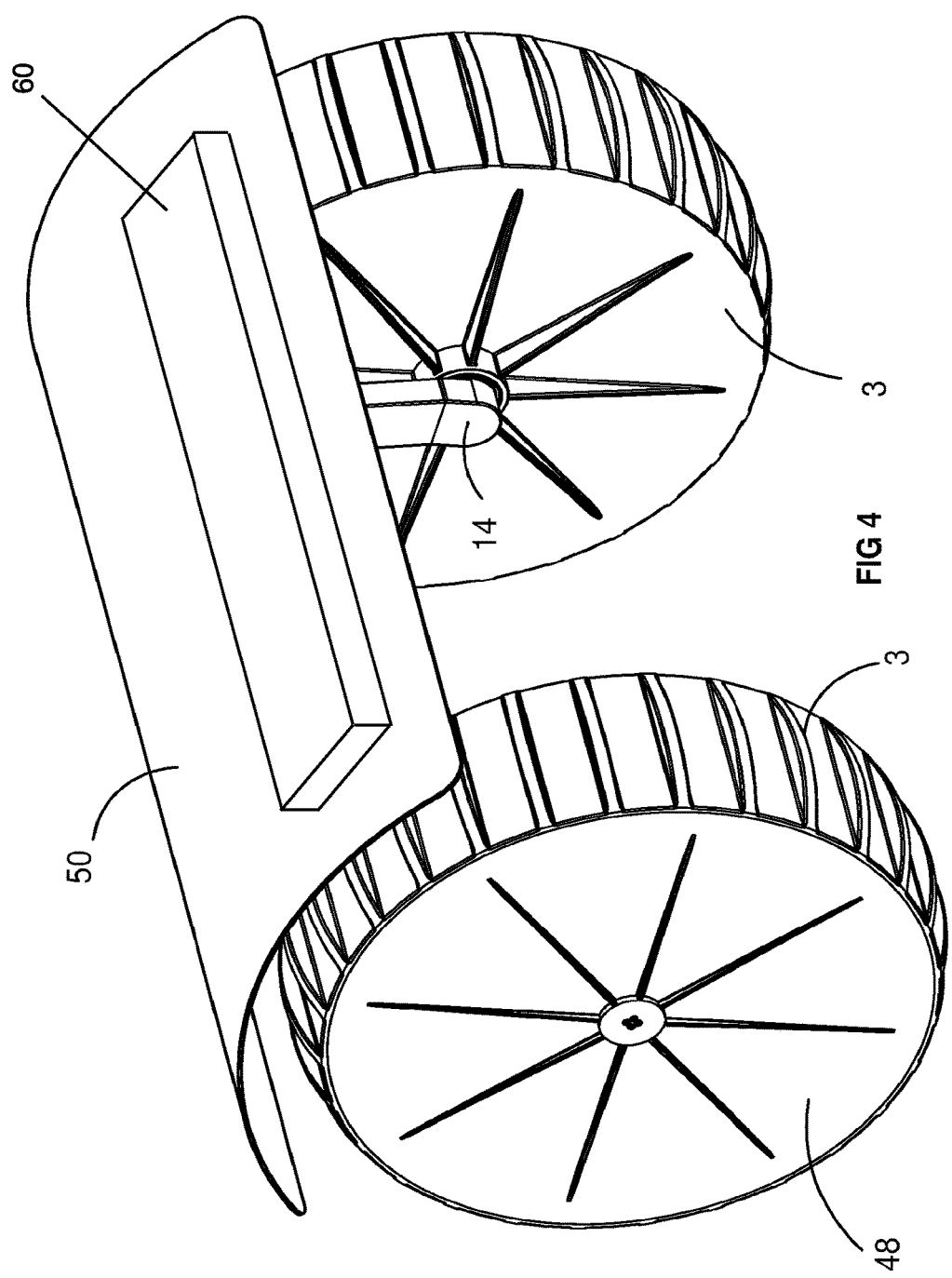
FIG. 4 is a perspective view of the vehicle of FIGS. 1 to 3, wherein the chassis incorporates a support platform.
Figure 7:
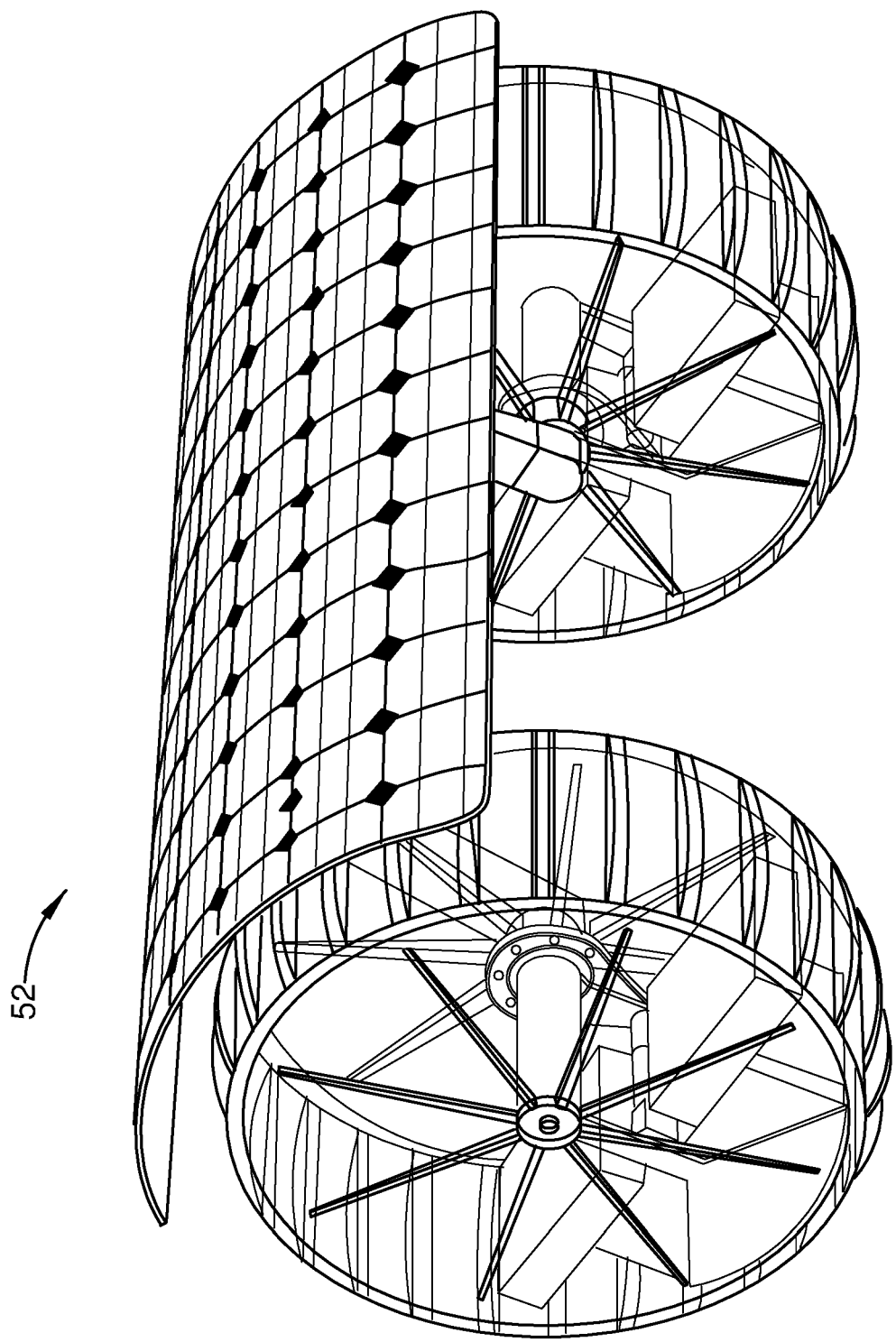
FIG. 7 is a partially transparent perspective view of a vehicle according to a further embodiment of the invention, in which the support platform incorporates a solar panel.

In the embodiment shown in FIGS. 4 and 5, the chassis 2 includes a primary support platform 50 adapted to support a payload. The support platform shown is curved with a radius similar to that of the wheels, such that the platform acts as an integral wheel guard while minimising the overall space occupied by the vehicle. However, support platforms and other support structures may be incorporated in a wide variety of shapes, sizes and configurations, according to the intended application. For example in the embodiment shown in FIGS. 7 and 8, the primary support platform 50 is adapted to support a solar panel 52, to provide supplementary electrical power for the drive motors and/or ancillary electrical equipment and prolong run time between battery charges.

In some embodiments, the support platform or the associated payload includes components and systems whereby the vehicle is adapted to function autonomously or substantially autonomously, as an omni-directional mobile platform for a robot. Examples of such components and systems include:—
  sensors suited to the intended application (such as ranging, imaging, localisation or inertial sensors),
  actuators or instruments suited to the intended application (such as manipulators, robotic arms, pan/tilt mechanisms, agricultural planting, weeding, spraying or harvesting mechanisms, drilling or mining tools, firefighting tools including water nozzles or chemical sprayers, weapons systems, medical instruments or devices, research or analytical instruments or tools, or lifting and positioning tools for logistics or materials handling),
  lighting systems (such as laser, UV, IR, LED or floodlighting systems),
  energy generation or conservation equipment (such as solar panels, sails, wind turbines or fuel cells), and/or
  ancillary electronic equipment (such as computers, data storage media, communications or navigation equipment, antennas or networking components).

In one embodiment, the support platform is adapted to support one or more robotic arms or other robotic devices. The platform may also be adapted for use as a launch pad for one or more other autonomous or supplementary support vehicles such as UAVs, UGVs, AUVs or other teleoperable devices.

One particularly advantageous form of the invention is adapted for agricultural applications, whereby the vehicle is used to traverse successive rows of planted vines, crops or trees to carry out monitoring and manipulation tasks such as pest detection, surveillance, mapping, yield estimation, planting, weeding, pruning, watering, fertilising or harvesting. For these purposes, the vehicle may include suitable combinations of sensing, computing and manipulation equipment such as cameras, lasers, radar scanners, robotic arms, spray nozzles, plotters and the like.

In some embodiments the bridge section of the chassis is also adjustable in length (see arrow 'W', FIG. 8), for example by means of telescopically extensible rods or rails, thereby allowing the track between the wheels to be selectively adjusted. If required, adjustment of chassis length may be effected on the fly, in response to control inputs from the control system, to assist the vehicle to navigate obstacles or varying terrain conditions. In some embodiments, the height of the chassis and/or the support platform is adjustable (see arrow 'H', FIG. 8). In some embodiments, the mass of the counterweight in each drive module is selectively adjustable, for example by installing or removing discrete weight modules formed from a heavy material such as iron or lead, or by adding or removing a liquid such as water from ballast tanks incorporated into the drive modules.

In addition to the static stability inherent in the vehicle, passive damping mechanisms as well as active control systems may also be incorporated to enhance dynamic stability. Such systems may include gyroscopic or inertial sensors, supplementary drive motors, active damping systems and other elements as required. Additional wheels, skids, props or suspension elements may also be provided to enhance stability or to limit the maximum extent of angular deviation of the chassis from the static equilibrium position, if needed. The vehicle preferably also includes dynamic control systems utilising various sensors and other elements outlined above to improve or optimise operational efficiency, regulate power consumption, minimise dynamic oscillations, avoid obstacles and/or optimise navigation and path following strategies.

Figure 9:
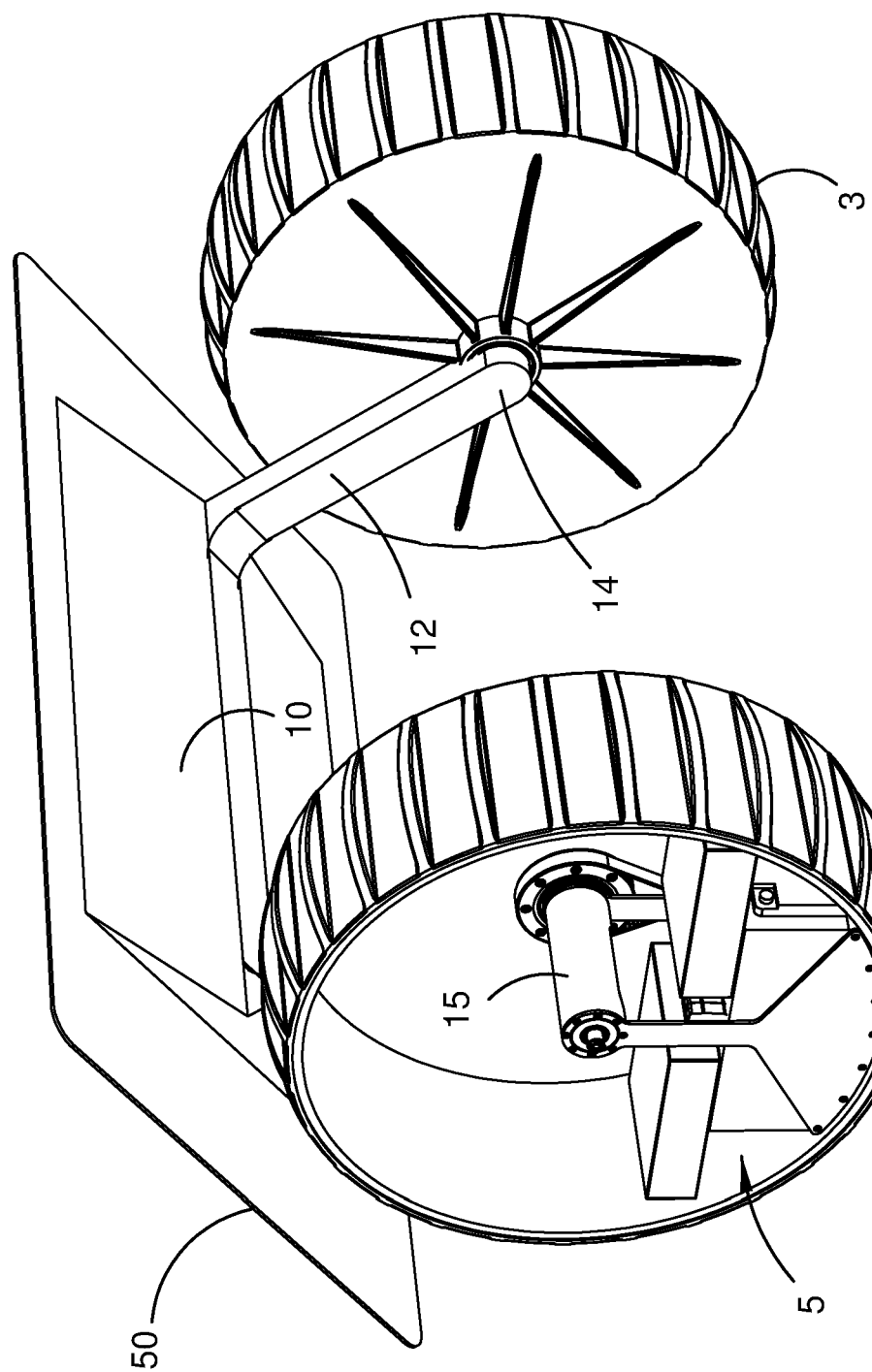
FIG. 9 is a perspective view showing a further embodiment of the invention, in which the angular orientation of the chassis is adjustable relative to the drive modules.

In the embodiment of FIG. 9, the angular orientation of the chassis and the associated support platform is selectively adjustable about the common axis, relative to the drive modules in the static equilibrium position. This may be advantageous for a variety of purposes, for example to orientate a solar panel on the support platform optimally toward the sun, to orientate a sail or blade for wind-assisted propulsion, to level the platform when operating on inclined terrain, to level the platform in compensation for unbalanced payloads, or to counteract the effect of dynamic forces during acceleration or deceleration of the vehicle. In this embodiment, the rotational adjustment is effected by rotation of the lugs 14 and hence the legs 12 of the chassis about the respective axles 15.

A variation of this embodiment is shown in FIG. 10. In this case, however, it will be seen that the rotational orientation of the legs 12 and other primary components of the chassis is fixed relative to the drive modules in the static equilibrium. However, the support platform 50 is rotatable about the common axis relative to the chassis, by means of radial support arms 55 which are connected to the respective axles 15. In this case, the rotational adjustment of the orientation of the primary support platform about the common axis with respect to the drive modules is effected by rotation of the arms 55 about the respective axles 15, independently of the chassis.

In variations of this embodiment, a supplementary support platform may also be mounted to the bridge section of the chassis itself. This enables some components or payloads on the supplementary support platform to be maintained in a substantially horizontal orientation, while simultaneously allowing other components on the primary support platform, such as solar panels, to be optimally inclined for particular operational purposes (or vice versa).

It will be appreciated that the invention in its various preferred embodiments provides a vehicle or mobile platform with a number unique features and advantages. By enabling the primary components of the drive modules such as batteries, motors, and controllers as well as additional counterweights to be substantially contained inside and positioned low within the respective wheels, the chassis bridge and payload can be positioned well above the wheel axis with the combined mass effectively counterbalanced by the drive modules. This lowers the overall centre of mass while providing significantly increased ground clearance within the footprint or wheel track of the vehicle. The inherent stability of the vehicle obviates the need for additional wheels, which in turn obviates the need for a separate steering mechanism, whether based on wheel pivoting or skid-steering systems. This reduces manufacturing cost due to the relatively small number of components and the inherent simplicity of the design, while increasing operational efficiency and manoeuvrability, in a highly flexible, adaptable and compact vehicle platform.

In particular, the ability to rely on extremely low positioning of the centre of mass of the drive modules improves static stability and thereby enables relatively higher payload masses or higher positioning of the payload on the chassis relative to previously known di-wheel vehicles. In some embodiments, the support platform may even be positioned above the maximum wheel height, thereby providing substantially greater ground clearance than even conventional wheeled vehicles, or vehicles with conventional axle arrangements. High manoeuvrability and omni-directionality is derived from the ability of the vehicle to pivot around its central vertical axis (by driving the wheels at equal speed in opposite directions). At the same time, vehicle motion is inherently efficient, since no wheels are required to drag or skid (assuming point contact for the wheels or tyres) during rolling or turning in any direction. In these and other respects, the invention represents a practical and commercially significant improvement over the prior art.

Although the invention has been described with reference to specific examples, it will be appreciated by those skilled in the art that the invention may be embodied in many other forms.

The invention claimed is:

1. A vehicle including a chassis, a pair of wheels supported in spaced apart relationship by the chassis for rotation about a common axis, and a pair of drive modules associated with the respective wheels,
   wherein the drive modules and the chassis are connected for rotation as a sub-assembly relative to the wheels about the common axis with the centre of mass of the sub-assembly below the common axis in a static equilibrium position,
   wherein each of the drive modules is housed substantially within the respective wheel, and
   wherein the centres of mass of the drive modules in the static equilibrium position are disposed substantially below the common axis, to counterbalance the chassis and thereby allow the centre of mass of the chassis and any associated payload to be stably positioned substantially above the common axis.

2. A vehicle according to claim 1, wherein the drive modules are substantially frontally occluded by the respective wheels.

3. A vehicle according to claim 1, wherein each of the drive modules includes at least a drive motor.

4. A vehicle according to claim 1, wherein the drive modules include a computerised control module.

5. A vehicle according to claim 1, wherein the drive modules include additional counterweights, thereby to enable the chassis to support payloads with relatively higher centres of mass.

6. A vehicle according to claim 1, wherein the chassis includes a primary support platform adapted to support a payload.

7. A vehicle according to claim 6, wherein the vehicle is adapted to function substantially autonomously.

8. A vehicle according to claim 6, wherein the primary support platform is counterbalanced such that the primary platform is predominantly supported at a level above the wheels of the vehicle.

9. A vehicle according to claim 6, wherein the primary support platform is adapted for use as a launch pad for one or more supplementary vehicles.

10. A vehicle according to claim 9, wherein the primary support platform is configured to include one or more docking stations enabling periodic battery charging or refilling for the one or more supplementary vehicles.

11. A vehicle according to claim 1, wherein the chassis is adapted to support one or more solar panels, to provide electric power for the drive motors and thereby extend vehicle runtime.

12. A vehicle according to claim 1, wherein the chassis is adjustable in length, thereby allowing the track between the wheels to be selectively adjusted.

13. A vehicle according to claim 1, wherein the chassis is selectively adjustable in height for obstacle avoidance and/or path optimisation.

14. A vehicle according to claim 1, wherein the vehicle includes a dynamic stability control system adapted to reduce tilting oscillations around the common axis.

15. A vehicle according to claim 1, wherein an angular orientation of the chassis, relative to the drive modules in the static equilibrium position, is selectively adjustable about the common axis.

16. A vehicle according to claim 1, wherein one or more additional wheels is incorporated between, in front of or behind the pair of wheels for stability, supplementary drive capacity and/or additional load bearing capacity.

17. A vehicle according to claim 16, wherein one or more additional wheels are supported for rotation on the common axis.

18. A vehicle according to claim 17, wherein the or each additional wheel incorporates a steering mechanism.

* * * * *